United States Patent Office 3,376,032
Patented Apr. 2, 1968

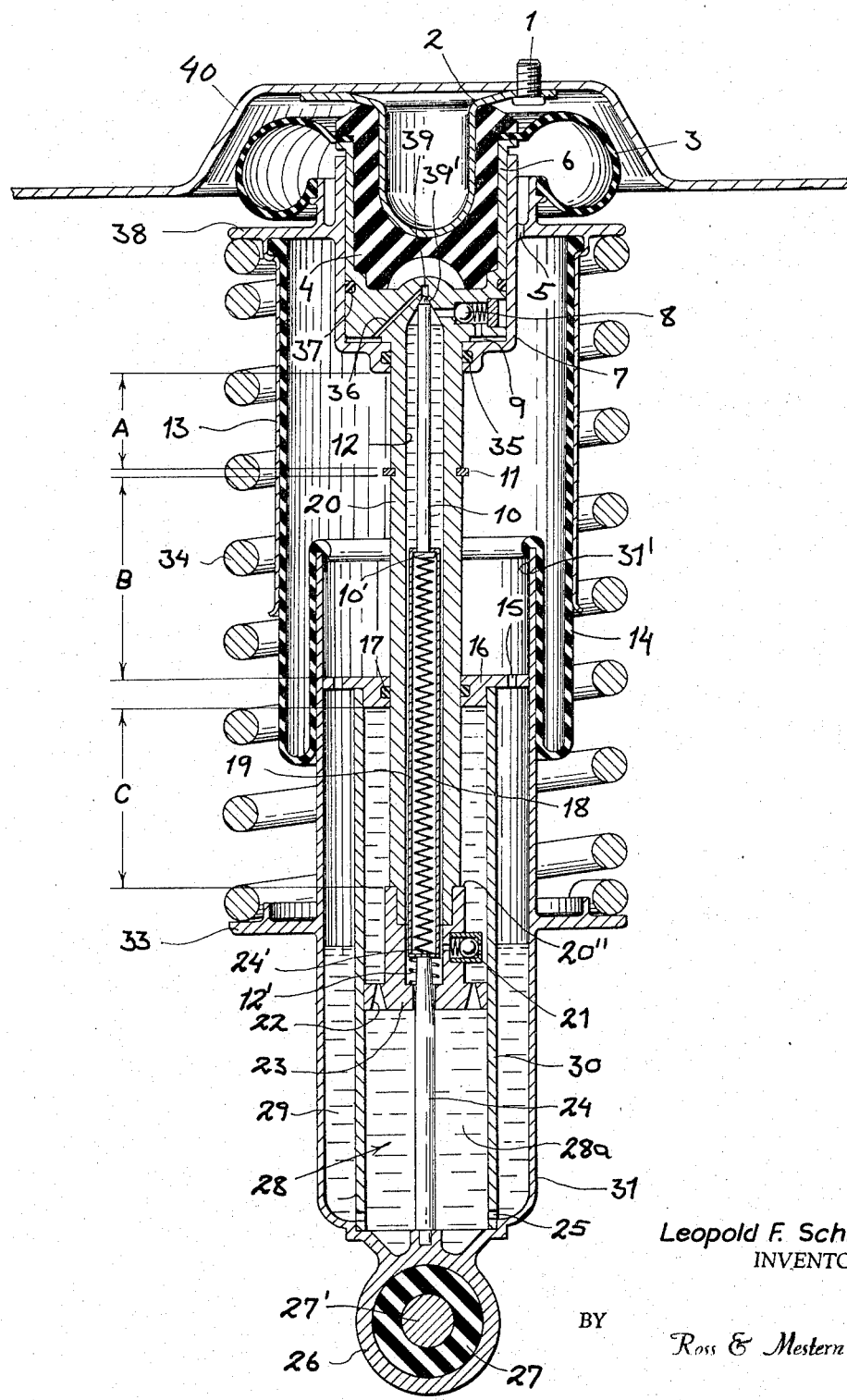
Leopold F. Schmid
INVENTOR.
BY Ross & Mestern

3,376,032
SHOCK ABSORBER FOR VEHICULAR SUSPENSION SYSTEMS AND THE LIKE
Leopold Franz Schmid, Stuttgart, Germany, assignor to Alfred Teves, Maschinen- und Armaturenfabrik KG, Frankfurt am Main, Germany, a corporation of Germany
Filed Nov. 18, 1965, Ser. No. 508,517
Claims priority, application Germany, Dec. 2, 1964, Sch 36,199
9 Claims. (Cl. 267—8)

ABSTRACT OF THE DISCLOSURE

A self-leveling shock absorber having a cylinder connected with the axle and a piston connected with the chassis and formed with a central bore receiving a pump plunger on the piston which, together with a valve whose stem is received in the bore, controls the pumping of fluid into a working chamber which displaces a spring seat to stress the spring surrounding the piston-and-cylinder arrangement to compensate for changes in the loading of the vehicle.

---

My present invention relates to an improved shock absorber for vehicular suspension systems and the like having two relatively movable parts, e.g., a vehicular chassis or body and a wheel assembly, whose relative movement is to be damped. More particularly, this invention applies to shock absorbers having hydraulic-dashpot devices for damping relative movement and provided with automatic means for establishing a normal spacing or positional relationship between the parts connected by the device even upon loading of the vehicle.

In the commonly assigned copending application Ser. No. 500,574, filed Oct. 22, 1965, by myself and Hans Erdmann and entitled, Shock Absorber for Vehicular Suspension Systems, now Patent No. 3,353,813, there is described a shock absorber wherein a pair of relatively movable members, such as a piston and a cylinder, together constitute a dashpot assembly and are displaceable from a normal relative position against the frictional and viscous resistance of a hydraulic fluid and against the restoring force of one or more biasing springs. As noted in this copending application, the cushioning effect of this system depends upon the stiffness of the springs employed so that, with relatively short and stiff springs, impacts are transmitted without sufficient attenuation, while with longer and softer springs the oscillation stroke will be relatively large. Furthermore, the system of the pending application provides means whereby the disadvantages of conventional shock absorbers, namely, the change in relative positions of the chassis and wheel assemblies with loading, can be eliminated by the use of pump means in the shock absorber capable of selectively stressing the spring and thus of maintaining the normal position of the chassis even though the latter may be loaded or relieved from load. One of the problems of a system having fluid-responsive means acting as a load-leveling device to maintain the normal height of the chassis in spite of loading or relieving of the load is that, after prolonged periods, of stand, the chassis sinks with respect to the predetermined spacing between the vehicular body and the wheel assembly.

It is the principal object of the present invention to provide a shock absorber having means for automatically restoring the normal spacing of the parts interconnected thereby but which will avoid the disadvantage mentioned above, thereby preventing alteration of this spacing with prolonged stand.

This object and others which will become apparent hereinafter are attained, in accordance with the present invention, in a shock absorber of the type generally described in the aforementioned copending application wherein a piston member and a cylinder member are respectively connected with the relatively movable parts of the vehicle, generally the chassis or body and the wheel assemblies, while forming a hydraulic dashpot and a pump means operable upon reciprocation of the members for displacing hydraulic fluid to automatically stress the spring, thereby adjusting the spacing between the connection points of these members and thus the relatively movable parts; the improvement resides primarily in the provision of a unique valve means and pump arrangement for the shock absorber whereby the flow of fluid from the pressure chamber of the fluid-displaceable level-adjusting means is blocked while the distance between the parts is less than the predetermined normal spacing and is unblocked upon the distance between the parts exceeding the predetermined spacing.

I have found, moreover, that it is highly advantageous for the valve means to be spring-loaded and controlled by the pump-plunger to establish the normal spacing or height of the chassis from the wheel assembly and this is advantageously accomplished by providing the piston member with an axially extending bore into which a plunger of the cylinder member extends for displacement of the fluid; the valve means can then include an axially shiftable rod biased by the preloaded spring within this bore against a valve seat between the bore and the expandable chamber formed by a fluid-displaceable seat for the suspension spring which surrounds the dashpot. The prestressed spring within this bore is enclosed in a sleeve in which the rod is axially inwardly displaceable and which is engaged by the plunger for controlling the normal level of the chassis and thus the normal spacing described above. When the vehicle is loaded, therefore, hydraulic fluid is pumped during the normal oscillations of the dashpot into the pressure chamber to stress the spring and raise the piston member connected with the chassis with respect to the fluid-displaceable seat and the cylinder member to restore the normal level of the chassis with respect to the wheel assemblies. Only when the spacing is exceeded is the flow of fluid from this chamber to the dashpot unblocked. Thus, there is no tendency for the vehicle to settle while at rest.

The above and other objects, features and advantages of the present invention will become more readily apparent from the following description, reference being made to the accompanying drawing in which the sole figure is an axial cross-sectional view through a generally cylindrical shock-absorber system embodying the invention.

In the drawing, I show a shock absorber in which a screw 1 holds a piston member 20 to the chassis 40 of the automotive vehicle via an elastomeric (e.g., rubber) cushion 4 at the head 6 of this piston. The head 6 defines with a cup-shaped portion 7 of a fluid-displaceable seat 38 an expandable pressure chamber 9 which can be supplied with a hydraulic fluid via the check valve 8 from an axially extending bore 12 through the shank of the piston member 20. The latter is formed with a plunger 23 received within a fluid-filled chamber 28 of a cylinder member 30 connected via an eye 26 with a wheel assembly of the vehicle, a rubber bushing 27 being provided between the eye 26 and the bolt 27' of this wheel assembly. The plunger 23 is provided with the usual throttling passages 22 establishing communication between the chambers 28a and 28b on opposite sides of the plunger 23 so that the piston 20 thereby forms with the cylinder 30 and oscillation-damping dash-pot of the type described in the aforementioned copending application or as conventionally used to attenuate oscillations in fluid-damped shock absorbers.

A further check valve 21 at the lower end of the piston 20 normally blocks outflow from the axial bore 12 of this piston member but functions as a suction or intake valve permitting fluid to be drawn from the dashpot into this bore for displacement into the chamber 9 by a plunger 24 of a pump means. Plunger 24, which is anchored to the floor of cylinder 30, cooperates with the piston 20 upon reciprocation of the piston member with respect to the cylinder member to displace fluid within this bore past the check valve 8 into chamber 9. For this purpose, the check valve 21 permits the influx of fluid to the bore from the dashpot but blocks outflow from the bore while the check valve 8 permits fluid flow from the bore 12 into the chamber 9 but blocks return flow therefrom. The cylinder 30 is surrounded by and affixed to a cylindrical reservoir 31 containing a supply 29 of hydraulic fluid which can be fed to the dashpot by passages 25 at the base of the cylinder 30. The reservoir 31 is axially open and is covered by a plug 16 which forms a seal for the chamber 28b but is provided with openings 15 communicating with the reservoir 31, the mouth 31' of the latter being likewise open for collection of hydraulic-fluid leakages, as will be described in greater detail hereinafter.

The device comprises a compression spring 34 urging the members 20 and 30 apart and thus yieldably resisting displacement of the wheel assembly in the direction of the chassis and vice versa. The compression spring 34 bears against a flange or disklike seat 33 affixed to the cylinder member 30 via the cylindrical reservoir 31 while the other end of the spring rests against the fluid-displaceable seat 38 which is integral or connected with the cup-shaped member 7. An opening 5 is provided to vent the interior of the cylindrical protective shield 13 of the fluid-displaceable seat which surrounds a flexible sleeve 14 whose opposite extremities are connected to the cylindrical wall 31 and the seat-forming member 38 to prevent fluid from entering the mouth 31' of the reservoir. A seal 37 is provided between the piston head 6 and the wall of the cup 7 while a passage 36 connects the chamber 9 with the axial bore 12 via an axial port 39 surrounded by a valve seat 39' engaged by the axially shiftable rod 10 of the valve means. The rod 10 is biased against the valve seat 39' by a prestressed compression spring 18 received within a sleeve 19 in the bore 12 within which the rod 10 is slidable but which can retract this rod via its shoulder 10' at its extremity opposite the valve seat. The sleeve 19 serves to maintain the precompression of spring 18 and is biased upwardly by a further compression spring 12' disposed between the sleeve and the wall of the bore 12; spring 12' has a force less than that of the prestressed spring 18. The plunger 24 is, moreover, coupled with the sleeve 19 at 24' in order to establish the proper level of the chassis with respect to the wheel assemblies and thus the normal relative positions of the piston member and the cylinder member 31. A flexible sleeve 3 connects the piston head 6 with the fluid-displaceable seat 38 to prevent entry of contaminants into the chamber while a seal 35 limits leakage from the chamber 9 along the shank of the piston member 20. A similar seal 17 prevents leakage of hydraulic fluid from the dashpot chamber 28b. Any leakage from chamber 9 flows along the shank of piston member 20 and then passes through bores 15 and the cap 16 into the reservoir chamber 29.

In the normal condition of the shock absorber, as illustrated in the drawing, a loading of the vehicle or an upward jolt can compress the asembly by the axial distance B while a withdrawal of the piston member from the cylinder member by the maximum distance C is possible upon the sudden fall of the wheel assembly or unloading of the vehicle with oscillation between the distances B and C about the normal position as is illustrated. A ring 11 engageable with the top of cap 16 defines the maximum inward displacement while a shoulder 20'' on the piston 20 is engageable with the cap to define the maximum extended position of the assembly. Because no road is completely smooth, there will be some oscillation of the wheel assembly with respect to the chassis upon operation of the motor vehicle under substantially all conditions so that the plunger 24 tends to displace fluid, drawn into the bore 12 through intake valve 21, past the outlet valve 8 into the chamber 9. Since the rod 10 blocks the port 39 under conditions in which the actual spacing is less than the predetermined normal spacing, hydraulic fluid will be pumped into the chamber 9. This chamber thus tends to expand with displacement of the seat-forming member 38 toward the cylinder 31, thereby compressing the spring 34 and increasing the force applied thereto concurrently with elevation of the piston member 20 until the load is again balanced by the spring at the predetermined level. When this level is attained, further influx of fluid into chamber 9 is offset by the bleeding of this chamber through the passage 39 since this passage is unblocked when the seat 39' is lifted from the rod 10. Thus, only when the normal position is re-established is the passage 39 unblocked and fluid permitted to flow from the chamber 9 back to the dashpot via the bore 12. Since spring 12' is disposed between the piston member 20 and the sleeve 18 and this spring has a force less than that of the prestressed spring 18, the rate at which fluid flows from the chamber 9 is reduced to provide a delay in the relief of chamber 9. This system permits the automatic re-establishment of the normal chassis level and spacing of the chassis from the wheel assemblies during operation of the vehicle with high exactitude and also prevents, by blocking leakage from the chamber 9, a settling of the chassis below its normal level. The parts are easily manufactured and assembled and relatively few movable parts are required. By adjusting the relative strength of the springs 12' and 18, the outflow delay of fluid from the chamber 9 can be selected in accordance with the type of automotive vehicle and the forces to be experienced by the suspension.

The invention described and illustrated is believed to admit of many modifications within the ability of persons skilled in the art, all such modifications being considered within the spirit and scope of the invention except as otherwise limited by the appended claims.

I claim:

1. In a shock absorber for vehicular-suspension systems and the like having two relatively movable parts whose relative movement is to be damped and having a predetermined normal spacing with respect to one another, said shock absorber comprising a piston member connected with one of said parts and a cylinder member connected with the other of said parts and slidingly receiving said piston member to form a hydraulic dash-pot therewith, and spring means normally urging said parts apart, the improvement which comprises:
   (a) a fluid-displaceable first seat for said spring means shiftable for selectively stressing same and defining a pressure chamber for a fluid capable of displacing said first seat;
   (b) a second seat formed on said cylinder member and engaging said spring means, said spring means comprising a compression spring substantially coaxial with said members and received between said seats, said fluid-displaceable seat defining said chamber with said piston member at a location axially remote from said dash-pot;
   (c) pump means formed by said members and operable upon relative reciprocation thereof for displacing fluid into said chamber to shift said first seat, said pump means including a bore formed in said piston member and axially extending from said dash-pot while communicating with said chamber, and a pumping plunger mounted on said cylinder member and extending axially into said bore for displacing fluid therein into said chamber; and (d) valve means for blocking the flow of fluid from said chamber while the distance between said parts is less than said predetermined spacing—and unblocking flow of fluid from said chamber upon the distance between said parts exceeding said predetermined spacing, said valve means including a valve seat formed on said piston member between said bore and said chamber substantially along the axis of said bore, an axially shiftable rod in said bore engageable with said valve seat for temporarily blocking communication between said bore and said chamber, and a spring received in said bore and yieldably urging said rod against said valve seat.

2. The improvement defined in claim 1 wherein said valve means further comprises an axially extending sleeve received within said bore and enclosing said spring for retaining the latter in a prestressed state, said rod being slidable in the sleeve with said prestressed spring bearing against said rod, and a further spring bearing upon said sleeve in the direction of said valve seat with a force less than the force of said prestressed spring.

3. The improvement defined in claim 2 wherein said plunger is engageable with said sleeve for withdrawing said rod from said valve seat upon separation of said parts beyond said predetermined distance and concurrent withdrawal of said piston member from said cylinder member.

4. The improvement defined in claim 3 wherein said fluid-displaceable seat is a cup and said piston member has an axially extending shank passing through said cup, said cylinder member being open in the direction of said cup and of a diameter in excess of said shank for collecting fluid leaking from said chamber between said cup and said shank.

5. The improvement defined in claim 4, further comprising a flexible sleeve connected with said fluid-displaceable seat and with said cylinder member and enclosing said shank and said cup at least in the region in which said shank passes through said cup and surrounding the open part of said cylinder member for preventing the entry of contaminants into said cylinder member.

6. The improvement defined in claim 4, further comprising first check-valve means communicating between said bore and said dash pot for admitting fluid from said dash pot into said bore for displacement by said plunger but blocking flow of fluid from said bore into said dash pot, and second check-valve means between said bore and said chamber for admitting fluid from said bore into said chamber but blocking the flow of fluid from said chamber to said bore.

7. The improvement defined in claim 4 wherein said parts are the chassis and the wheel assembly of the automotive vehicle, said cylinder member being connected with said wheel assembly and said piston member being connected with said chassis.

8. The improvement defined in claim 7 wherein said piston member is formed with an enlarged head defining said chamber with said fluid-displaceable seat, further comprising an elastomeric cushion interposed between said head and the chassis.

9. The improvement defined in claim 8 further comprising a flexible sleeve between said head and said fluid-displaceable seat for preventing entry of contaminants into said chamber.

References Cited
UNITED STATES PATENTS

| | | | |
|---|---|---|---|
| 2,592,391 | 4/1952 | Butterfield | 267—8 |
| 3,150,867 | 9/1964 | Droegkamp | 267—8 |
| 3,179,401 | 4/1965 | Bartram et al. | |

ARTHUR L. LA POINT, *Primary Examiner.*

R. M. WOHLFARTH, *Assistant Examiner.*